March 1, 1966 D. R. CROMPTON-COUVELA 3,238,472

DOUBLE SIDEBAND MODULATOR CIRCUIT TRANSMITTING SUPPRESSED CARRIER OR PARTIAL CARRIER SIGNALS

Filed April 2, 1963 3 Sheets-Sheet 1

PRIOR ART

INVENTOR:
DENYS R. CROMPTON-COUVELA
Brown, Schuyler & Beveridge
ATTORNEYS

INVENTOR:
DENYS R. CROMPTON-COUVELA
Browne, Schuyler & Beveridge
ATTORNEYS 3,238,472
Patented Mar. 1, 1966

3,238,472

DOUBLE SIDEBAND MODULATOR CIRCUIT TRANSMITTING SUPPRESSED CARRIER OR PARTIAL CARRIER SIGNALS

Denys Roland Crompton-Couvela, Hornsby, New South Wales, Australia, assignor to Telephone & Electrical Industries Pty. Ltd., Sidney, New South Wales, Australia, a company of New South Wales, Australia Filed Apr. 2, 1963, Ser. No. 269,923
Claims priority, application Australia, Apr. 9, 1962, 16,323/62
8 Claims. (Cl. 332—44)

This invention relates to apparatus for modulating carrier frequency signals with voice frequency signals in an electrical communication system in which the carrier is transmitted together with both sidebands and to the setting in the field by relatively unskilled technicians of the depth of the said modulation. Moreover, by use of the invention the said setting of the depth of modulation may be accomplished with simple, inexpensive measuring equipment such as is normally available to technicians servicing such systems. Communication systems are known in which the signals to be transmitted are modulated on to a carrier signal. It has been found, however, that various difficulties arise in the design of modulators for use in such systems so that they perform their functions reliably and accurately over a wide range of electrical and environmental conditions.

It is an object of the present invention to provide improved modulating apparatus for use in the transmitting terminal equipment of an electrical communication system which performs the function above described.

In particular, in the transmitting terminal equipment of certain known communication systems it has been found difficult to ensure that the impedance of diode networks is directly proportional to a modulating signal, and consequently the output signal envelope has not possessed the same shape as the modulating signal. It is another object of the invention that such distortion should be greatly reduced.

According to the invention in one of its aspects, therefore, a carrier frequency modulation system comprises, in combination, means wherein a carrier signal is fed to a hybrid network which splits the signal along two routes, one of said routes passing through two diodes in parallel, each of said diodes having its downstream end interconnected to the upstream end of the other by another diode disposed in an upstream conducting sense, and the other of said routes passing through a pair of resistors connected for switching alternatively to either of the following conditions: (1) one resistor in each leg of the said other route so that the carrier is passed to the second hybrid network and recombined with the sidebands for transmission to line as a composite signal; (2) one resistor shunted across each hybrid so as to leave the system substantially balanced but to suppress the carrier. By "upstream" and "downstream" it is intended to convey the polarity of signal transferred through the diodes of the diode bridge connected to the first hybrid transformer.

Certain particular embodiments of the invention will now be described with reference to the accompanying drawings in which similar references indicate corresponding parts, and in which.

Figure 1:
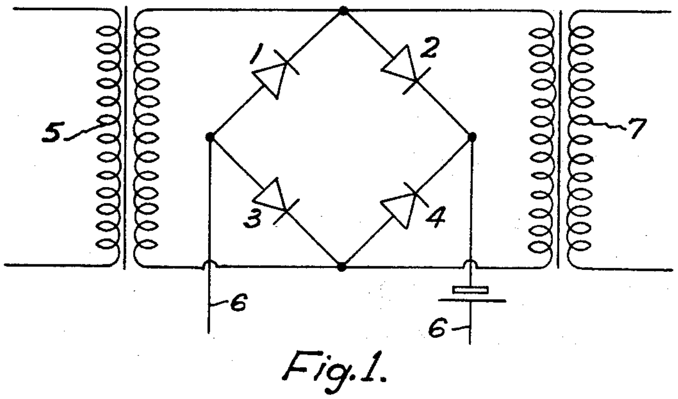
Fig. 1. PRIOR ART
FIG. 1 shows an example of terminal equipment as presently known.

Apparatus of the kind in use up to the present time in transmitting terminal equipment of electrical communication systems is illustrated in the example shown in FIG. 1 in which the diodes 1, 2, 3 and 4 act as a shunt impedance to the path of the carrier signal applied to the input transformer 5, the value of the shunt impedance being controlled by the instantaneous value of a modulating signal applied at 6. In this manner the amplitude of the output signal, derived from the output transformer 7, is caused to follow the instantaneous value of the modulating signal.

However, the impedance of the diode network is not directly proportional to the modulating signal and thus the output signal envelope does not possess exactly the same shape as the medulating signal.

Figure 2:
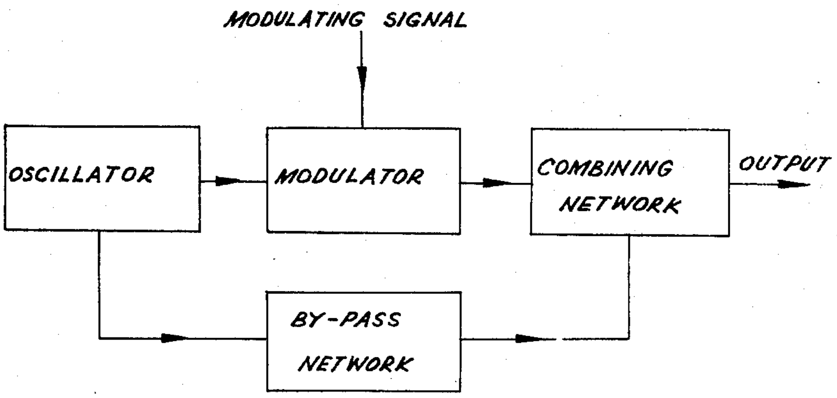
Fig. 2. PRIOR ART
FIG. 2 shows a system similar to that of FIG. 1, but using a different type of modulator.
Figure 3:
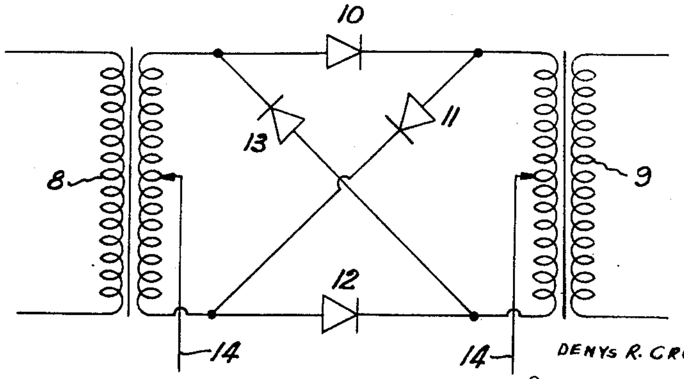
FIG. 3 shows the modulator used in the system of FIG. 2.

Other apparatus in use up to the present time takes the form shown, for example, in FIG. 2 in which a different type of modulator is used from that shown in FIG. 1. A modulator of the type used in FIG. 2 is shown in FIG. 3, and is not prone to the distortion mentioned in the preceding paragraph. Here, the modulating signal 14 is applied to the respective centre-tapped input and output transformers 8 and 9 as shown, and thence to the network of diodes 10, 11, 12 and 13. However, a modulator of this type does not pass the carrier input signal to the output, and thus it is necessary to re-inject the carrier frequency by some other means, such as the by-pass network shown in FIG. 2.

The by-pass network path of FIG. 2 is likely to have a phase-shift characteristic different from that of the modulator path unless elaborate precautions are taken to prevent this. Such phase-shifts can occur, for instance, if the carrier is re-injected between two stages of an electronic amplifier. It is well known that in systems in which the carrier is transmitted together with both sidebands, such phase-shifts are undesirable. It is an advantage of the present invention that while using the modulator form shown in FIG. 3 such additional precautions are not necessary and the modulator functions satisfactorily over a wide range of frequencies.

Figure 4:
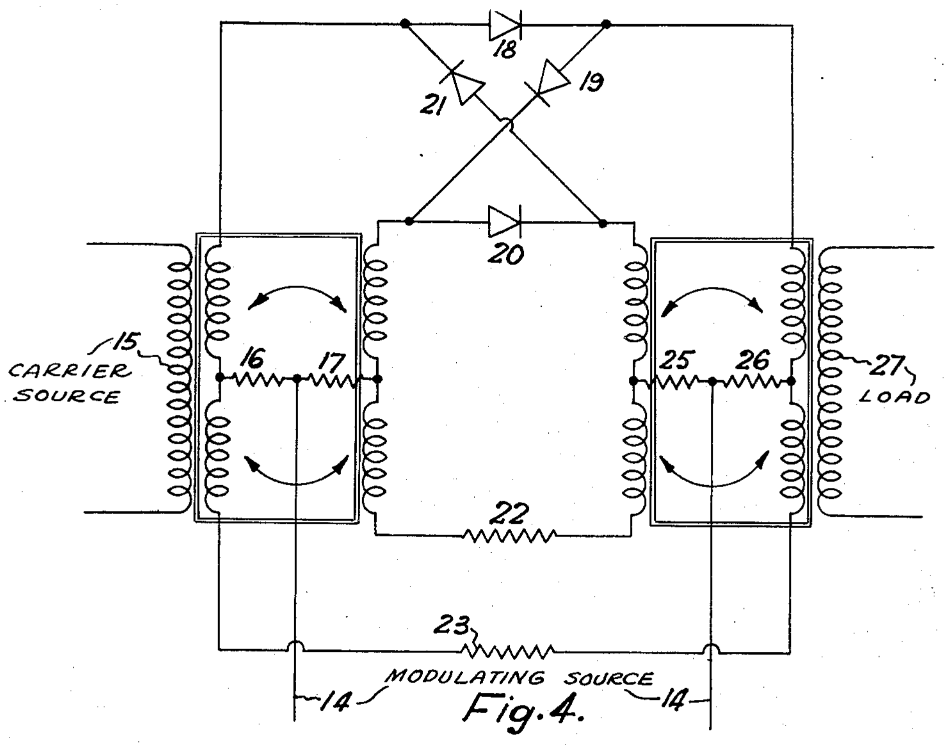
FIG. 4 shows one embodiment of terminal equipment according to the present invention.
Figure 5:
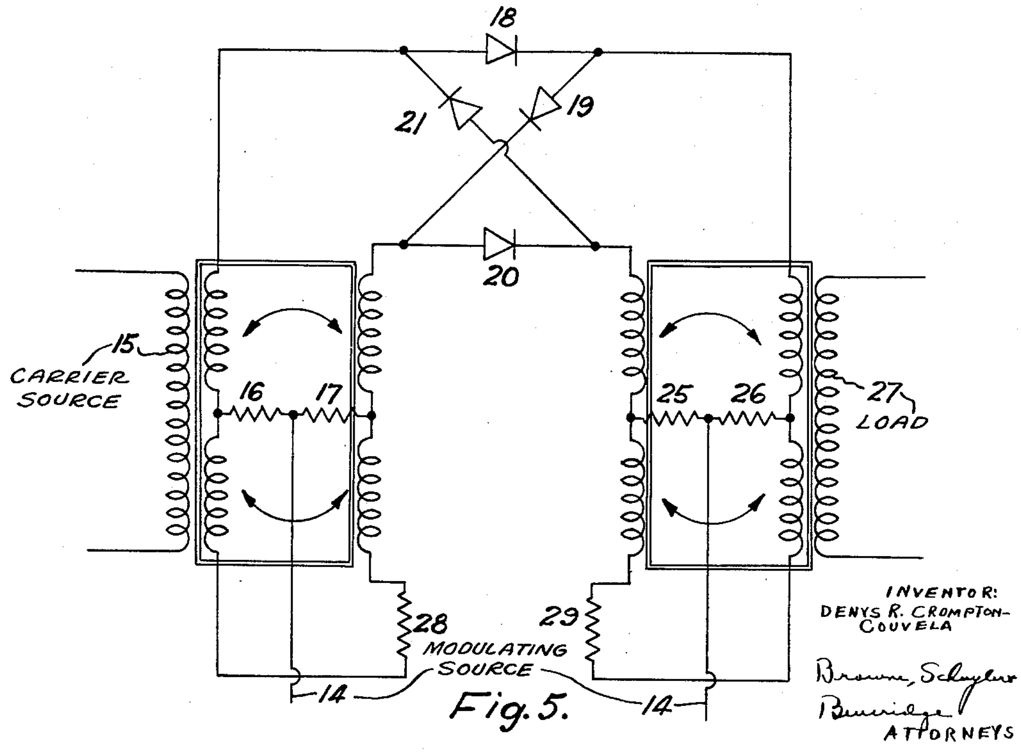
FIG. 5 shows a modification of the arrangement shown in FIG. 4.
Figure 6:
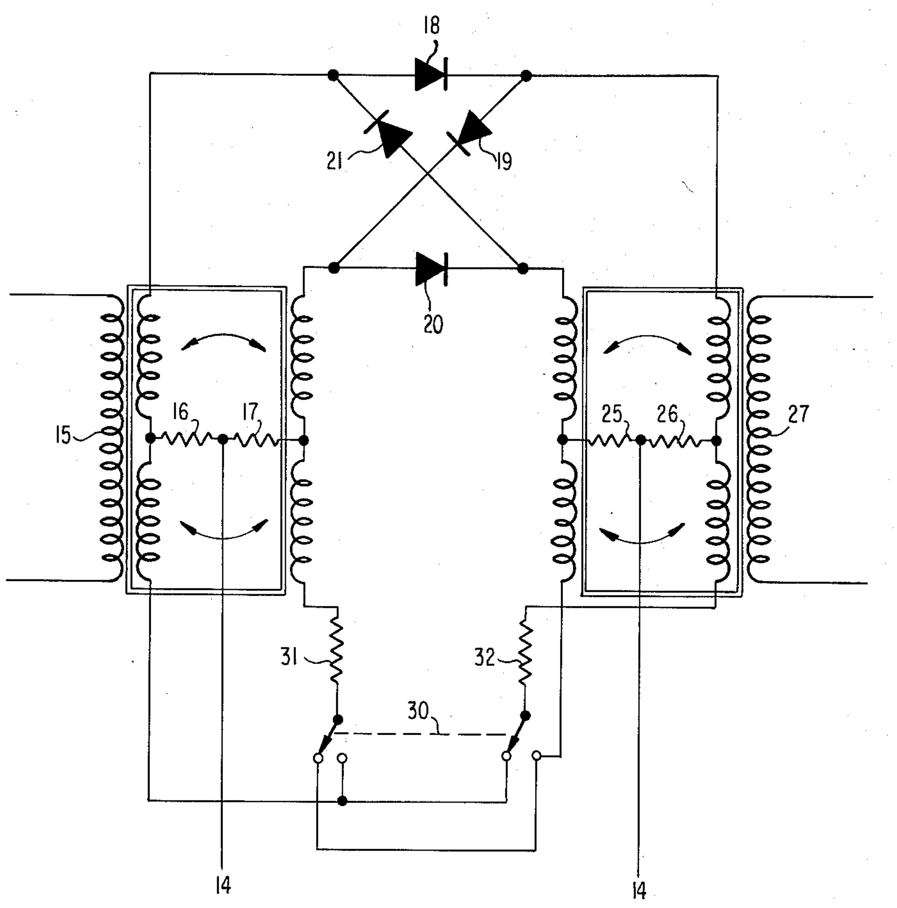
FIG. 6 shows the arrangements of FIGS. 4 and 5 combined into one circuit.

The general arrangement of components in the apparatus which is the subject of the present application is shown in FIGS. 4, 5 and 6, in which splitting of the carrier signal is achieved by connecting a pair of resistors in series from center point to center point of the pairs of divided windings of the hybrid transformers, and applying the modulating signal across the two center points of the said two pairs of resistors.

In FIG. 4 it will be seen that the carrier signal is fed to a hybrid network which consists of the input transformer 15 which forms a part of a hybrid network, including the resistors 16 and 17, and which splits the signal along two routes to a similar hybrid network, including resistors 25, 26, and output transformer 27. The modulating signal is applied on legs 14 to the resistors 16, 17 and 25, 26, as shown. Resistors 16, 17 and 25, 26 form the balance resistors of the respective hybrid networks. Moreover, the insertion of the modulating signal at the center point of each pair of resistors ensures that substantially no modulating signal appears in the output. One of these routes leads to the modulator diodes 18, 19, 20 and 21. Such a modulator passes only the sidebands, the carrier being suppressed. The other leads to a resistive network 22, 23 and 24. Upon the application of the modulation input signal 14 as shown, the two outputs of these two networks are then fed to the two inputs of another hybrid network consisting of the resistors 25 and 26 and the output transformer 27, and in which they are combined to form a composite output signal the values of the resistors 22, 23 may be chosen for proper balance of the hybrid networks.

The paths followed by the two signal components are substantially the same and it follows that the phase-shift characteristics of the two paths will be similar, allowing the apparatus to operate satisfactorily over a wide range of frequencies.

The paths followed by the two signal components are separated from one another by the hybrid networks and thus any interaction, which could cause distortion at high depths of modulation, is avoided.

It is possible, by altering the circuit positions of the resistors 16 and 17 in FIG. 4, to terminate one channel of the hybrid transformers and break the signal path. The device then takes the modified form shown in FIG. 5, in which the resistive network 22 and 23 has been replaced by the two resistors 28 and 29 which break the carrier route between the input and output hybrid networks, but leave them correctly terminated and balanced. The output signal will then consist of the two sidebands only and no carrier. In this condition it is possible to measure the level of the sidebands alone with a level detector, and to compare this measurement with the level of the carrier alone made with the same detector, from which comparison the dept of modulation may be deduced.

According to the invention, however, the carrier may be either suppressed or transmitted inasmuch as the arrangements illustrated in FIGS. 4 and 5 may be combined in one circuit by the inclusion of a switch 30, as shown in FIG. 6, in which the hybrid transformers 15 and 27 have been shown with schematic coupling in the interests of clarity FIG. 6 thus shows both the modifications of FIGS. 4 and 5 wherein the series resistors 22, 23 and the shunt resistors 28, 29 have been replaced by two resistors 31, 32 which may be connected together either in series as in FIG. 4 or in shunt as in FIG. 5. In the position shown in FIG. 6, the switch arms place the resistors in series to transmit the carrier and with the arms in the opposite position puts the resistors in shunt to suppress the carrier and transmit only the sidebands. The invention therefore consists of modulating and carrier-bypassing apparatus as described above with the provision of switching facilities whereby the two series resistors which normally bypass the carrier around the carrier suppressing modulator may be arranged alternatively in shunt, one terminating each of the carrier bypassing sections of the input and output hybrid networks, thus suppressing the carrier.

I claim:

1. A carrier frequency modulation system comprising, in combination, means wherein a carrier signal is fed to a hybrid network which splits the signal along two routes, one of said routes passing through two diodes in parallel, each of said diodes having its cathode interconnected to the anode of the other by another diode poled for conduction from said cathodes to said anodes, respectively, and the other of said routes passing through a pair of parallel resistors such that the signal passed by the two cathodes of said first-mentioned diodes and the signal passed by said parallel resistors are fed to a second hybrid network in which they are combined to form a composite output signal comprising sidebands and a portion of the carrier.

2. A carrier frequency modulation system as claimed in claim 1, wherein the resistance network consisting of said parallel pair of resistors and switch means effective, on closing, to pass said carrier frequency to said second hybrid network, and on opening, to terminate said second route at said resistors without bypassing said diodes.

3. A carrier frequency modulation system according to claim 1, wherein each said hybrid network comprises a transformer.

4. A carrier frequency modulation system according to claim 3 wherein said hybrid network comprises a transformer.

5. A carrier frequency modulation system comprising, in combination, means wherein a carrier signal is fed to a hybrid network which splits the signal along two routes, one of said routes passing through two diodes in parallel, each of said diodes having its cathode interconnected to the anode of the other by another diode poled for conduction from said cathodes to said anodes, respectively, and the other of said routes being terminated by a resistor such that the output signal at the two cathodes of said first-mentioned diodes is fed to a second hybrid network, to the input of which is connected a second terminating resistor, so that the resulting output of said second hybrid network comprises substantially only the sidebands of said carrier signal.

6. A carrier frequency modulation system according to claim 2 wherein said hybrid network comprises a transformer.

7. A system for modulating a carrier frequency comprising, in combination, means wherein a carrier signal is fed to a hybrid network which splits the signal along two routes, one of said routes passing through four diodes arranged in a bridge modulator network, and the other of said routes being provided with two resistors, including means therein for switchingly connecting in a first condition one resistor in each leg of the said other route so that the carrier is passed to the second hybrid network for recombining therein with the sidebands for transmission to line as a composite signal, and in a second condition one resistor in shunt across each hybrid so as to leave the system substantially balanced thereby to suppress the carrier.

8. A system for modulating a carrier frequency according to claim 7 wherein each said hybrid network comprises a hybrid transformer and a pair of resistors connected in series from center-point to center-point of pairs of divided windings comprising the hybrid transformer, the modulating signal being applied at the two center-points of the two pairs of resistors.

References Cited by the Examiner

UNITED STATES PATENTS

| | | | |
|---|---|---|---|
| 2,432,390 | 12/1947 | Darby | 328—209 X |
| 2,455,732 | 12/1948 | Carter | 332—47 X |
| 2,820,949 | 1/1958 | Hey | 332—47 |

HERMAN KARL SAALBACH, *Primary Examiner.*

ELI LIEBERMAN, ALFRED L. BRODY, *Examiners.*

P. L. GENSLER, *Assistant Examiner.*